(12) United States Patent
Shinbo et al.

(10) Patent No.: US 10,480,610 B2
(45) Date of Patent: Nov. 19, 2019

(54) NOISE VIBRATION ENERGY DAMPING STRUCTURE IN VEHICLE

(71) Applicant: MAZDA MOTOR CORPORATION, Hiroshima (JP)

(72) Inventors: Shintaro Shinbo, Kure (JP); Seiji Nakano, Higashihiroshima (JP); Kohji Hashida, Hiroshima (JP); Jumpei Kawamoto, Hiroshima (JP); Hiroaki Ishizu, Hiroshima (JP); Masashi Notomi, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/047,617

(22) Filed: Jul. 27, 2018

(65) Prior Publication Data

US 2019/0040930 A1 Feb. 7, 2019

(30) Foreign Application Priority Data

Aug. 3, 2017 (JP) .................................. 2017-150809

(51) Int. Cl.
*F16F 15/04* (2006.01)
*E01B 19/00* (2006.01)

(52) U.S. Cl.
CPC ............ *F16F 15/04* (2013.01); *E01B 19/003* (2013.01)

(58) Field of Classification Search
CPC ............................... F16F 15/04; E01B 19/003
See application file for complete search history.

(56) References Cited

U.S. PATENT DOCUMENTS

| 2,044,713 | A | * | 6/1936 | Trott | ......................... F16F 1/54 |
| | | | | | 248/605 |
| 5,580,028 | A | * | 12/1996 | Tomczak | ............. B60G 99/004 |
| | | | | | 248/632 |
| 2016/0355080 | A1 | * | 12/2016 | Wada | ........................ B62M 7/02 |
| 2019/0040930 | A1 | * | 2/2019 | Shinbo | ..................... F16F 15/04 |
| 2019/0108825 | A1 | * | 4/2019 | Acharya | ............... G10K 11/168 |

FOREIGN PATENT DOCUMENTS

| JP | H05-319308 A | 12/1993 |
| JP | 2015-134536 A | 7/2015 |

* cited by examiner

*Primary Examiner* — John D Walters
*Assistant Examiner* — James J Triggs
(74) *Attorney, Agent, or Firm* — Studebaker & Brackett PC

(57) ABSTRACT

Disclosed herein is an damping structure including a vibration energy damping member absorbing, from a vibration energy path member, at least part of noise vibration energy transmitted through the vibration energy path member, wherein a length of the vibration energy damping member is equal to or more than a half of a wavelength of the vibration of the vibration energy path member, and at least one attachment part attaching the vibration energy damping member to the vibration energy path member is disposed in a position corresponding to an antinode of the vibration of the vibration energy path member.

10 Claims, 9 Drawing Sheets

NOISE VIBRATION ENERGY DAMPING STRUCTURE IN VEHICLE

CROSS-REFERENCE TO RELATED APPLICATION

This application claims priority to Japanese Patent Application No. 2017-150809 filed on Aug. 3, 2017, the entire disclosure of which is incorporated by reference herein.

BACKGROUND

The technique disclosed in this specification relates to a noise vibration energy damping structure in a vehicle, more specifically, a structure for damping noise vibration energy generated at a power unit comprised of an engine and a transmission and transmitted to a cabin.

Conventionally, a structure for damping noise vibration energy generated at a power unit comprised of an engine and a transmission and transmitted to a cabin is known in order to improve quiet performance of a vehicle.

For example, Japanese Unexamined Patent Publication No. H05-319308 discloses a front body structure of a vehicle, the structure comprising a front side frame having a closed cross section, a supporting device attached to the front side frame and supporting a power unit, and a reinforcing member provided to an inner side of a portion of the front side frame to which the supporting device is attached.

Also, Japanese Unexamined Patent Publication No. 2015-134536 discloses a structure in which a node member is disposed in a frame constituting a vehicle body and having a closed cross section, and a vibration damping member is disposed in the node member, thereby damping vibration to be transmitted to a cabin (i.e., noise vibration energy).

SUMMARY

Noise vibration energy transmitted from the power unit may be generated due to engine vibration or gear noise from a transmission. If noise vibration energy caused by such reasons is transmitted to the cabin, a problem of noise vibration harshness ("NVH") becomes significant.

Only providing a reinforcing member to a portion where a supporting device is provided just like the technique disclosed in Japanese Unexamined Patent Publication No. H05-319308 or disposing a vibration damping member in a node member in the inside of a frame just like the technique disclosed in Japanese Unexamined Patent Publication No. 2015-134536 can damp a small amount of such noise vibration energy, resulting in a small noise vibration damping effect.

To deal with this problem, increasing the size of the area where the reinforcing member is disposed or increasing the number of the node members may be considered. However, in this case, the weight of the vehicle may be increased, significantly.

The technique disclosed in this specification is conceived in view of the above problems, and attempts to efficiently damp noise vibration energy in a vehicle while reducing an increase in the weight of the vehicle as much as possible.

Through the study of the inventors of the present invention, they found that at least part of noise vibration energy generated at the power unit is moved from a vibration energy path member, which is to transmit the noise vibration energy to a cabin, to another member, thereby damping the noise vibration energy to be transmitted to the cabin.

In order to solve the above problems, the technique disclosed in this specification is directed to a noise vibration energy damping structure in a vehicle, the noise vibration energy damping structure damping noise vibration energy that is generated at a power unit of the vehicle comprised of an engine and a transmission and that is to be transmitted to a cabin of the vehicle. The noise vibration energy damping structure includes: a vibration energy path member, to which a supporting device supporting the power unit is attached, constituting a transmission path which vibrates by receiving the noise vibration energy transmitted through the supporting device, and which transmits the noise vibration energy to the cabin; and a vibration energy damping member provided on the transmission path of the vibration energy path member, and absorbing, from the vibration energy path member, at least part of the noise vibration energy to be transmitted from the vibration energy path member to the cabin. The vibration energy damping member is disposed substantially along a transmission direction in which vibration of the vibration energy path member caused by the noise vibration energy is transmitted, a length of the vibration energy damping member in the transmission direction is equal to or more than a half of a wavelength of the vibration of the vibration energy path member, and the vibration energy path member is provided with at least one attachment part attaching the vibration energy damping member to the vibration energy path member, and the at least one attachment part is disposed in a position corresponding to a position of at least one antinode of the vibration of the vibration energy path member.

According to this configuration, at least part of the noise vibration energy to be transmitted from the vibration energy path member to the cabin through the supporting device can be moved to the vibration energy damping member. In other words, attaching the vibration energy damping member to the vibration energy path member allows for transmitting the vibration of the vibration energy path member to the vibration energy damping member. Then, the part of the noise vibration energy is moved from the vibration energy path member to the vibration energy damping member. Thus, the noise vibration energy in the vibration energy path member is reduced by noise vibration energy moved to the vibration energy damping member. As a result, the noise vibration energy to be transmitted from the vibration energy path member to the cabin is damped by the vibration energy damping member.

The length of the vibration energy damping member in the transmission direction in which the vibration of the vibration energy path member caused by the noise vibration energy is transmitted is equal to or more than the half of the wavelength of the vibration, and at least one attachment part attaching the vibration energy damping member to the vibration energy path member is disposed in a position corresponding to the antinode of the vibration of the vibration energy path member caused by the noise vibration energy. Therefore, the vibration energy damping member is attached to a position of at least one of the antinodes of the vibration of the vibration energy path member. Thus, the vibration energy damping member is attached to the portion, with a large vibration amplitude, of the vibration energy path member, efficiently transmitting the vibration of the vibration energy path member to the vibration energy damping member. As a result, the noise vibration energy is efficiently moved from the vibration energy path member to the vibration energy damping member. This can efficiently damp the noise vibration energy which is generated at the power unit and which is to be transmitted to the cabin.

Further, the vibration energy damping member may have a length equal to or more than the half of the wavelength of the vibration of the vibration energy path member, making it possible to reduce an increase in the weight of the vehicle due to providing the vibration energy damping member as much as possible.

Accordingly, noise vibration energy can be efficiently damped while an increase in the weight of the vehicle is reduced as much as possible.

In the vehicle noise vibration energy damping structure, the vibration energy damping member preferably has an energy converting function of converting the noise vibration energy moved from the vibration energy path member into heat energy.

According to this configuration, the noise vibration energy moved from the vibration energy path member to the vibration energy damping member can be consumed as heat energy by the vibration energy damping member without being transmitted to other components. This can more reliably damp the noise vibration energy.

In the vehicle noise vibration energy damping structure in which the vibration energy damping member has an energy converting function, the vibration energy damping member preferably have a planar shape, and the vibration energy damping member is preferably attached to the vibration energy path member so as to constitute a fin using the at least one attachment part as a fixed end, and the fin is preferably configured to vibrate due to the noise vibration energy moved from the vibration energy path member to convert the noise vibration energy into the heat energy.

That is to say, if the vibration energy damping member constitutes the fin, the fin vibrates due to the noise vibration energy moved from the vibration energy path member to the vibration energy damping member, converting the noise vibration energy into heat energy. If the vibration energy damping member has a planar shape, the fin can be formed easily, making the noise vibration energy damping structure with a simple structure.

In one aspect of the vehicle noise vibration energy damping structure in which the vibration energy damping member constitutes a fin, the vibration energy path member is a front side frame of the vehicle, the front side frame extends in a longitudinal direction of the vehicle, and has a rectangular cross section, the supporting device is disposed in an intermediate part of the front side frame in the longitudinal direction of the vehicle, and the vibration energy damping member is attached to at least one of side walls of the front side frame in a width direction of the vehicle at a longitudinal position between the supporting device and the cabin.

That is to say, the front side frame is typically coupled to a dash panel, and thus, the vibration caused by the noise vibration energy generated at the power unit tends to be transmitted to the cabin via the front side frame. Therefore, if the vibration energy damping member is disposed at a longitudinal position of the front side frame between the supporting device and the cabin, the noise vibration energy which is generated at the power unit comprised of the engine and the transmission and which is to be transmitted to the cabin can be more efficiently damped. The front side frame is typically vertically coupled to apron members above the front side frame and the suspension cross member below the front side frame. Thus, the vibration at both side walls in the width direction of the vehicle tends to be transmitted to the cabin, compared with the vibration at the upper and lower walls. Therefore, attaching the vibration energy damping member to at least one of the side walls of the front side frame in the width direction of the vehicle, efficiently moving the noise vibration energy from the front side frame to the vibration energy damping member. This can still more efficiently damp the noise vibration energy.

Further, the outside of the front side frame in the width direction of the vehicle is provided with less vehicle components than the inside of the front side frame in the width direction of the vehicle is. Therefore, the configuration of attaching the vibration energy damping member to the outer side wall of the front side frame in the width direction of the vehicle can dispose the vibration energy damping member, more freely. This makes it possible to dispose the vibration energy damping member to still more efficiently damp the noise vibration energy.

In another aspect of the vehicle noise vibration energy damping structure in which the vibration energy damping member constitutes a fin, the vibration energy path member is a suspension cross member coupling a pair of front side frames provided to the vehicle together in a width direction of the vehicle, a starting point of the suspension cross member at which transmission of the noise vibration energy is started is a support portion of the supporting device disposed in substantially a central portion of the suspension cross member in the width direction of the vehicle, and the vibration energy damping member extends in the width direction of the vehicle, and is attached to the suspension cross member so as to include the support portion of the suspension cross member.

That is to say, the suspension cross member is typically coupled to a floor frame coupled to a floor panel, and thus, the vibration caused by the noise vibration energy generated at the power unit tends to be transmitted to the cabin through the suspension cross member. The suspension cross member is also coupled to the front side frame, and thus, the vibration caused by the noise vibration energy generated at the power unit may be transmitted to the front side frame through the suspension cross member, and then, may be transmitted to the cabin. To handle this risk, providing the suspension cross member with the vibration energy damping member can still more efficiently damp the noise vibration energy which is generated at the power unit comprised of the engine and the transmission and which is to be transmitted to the cabin. Attaching the vibration energy damping member so as to include the supporting device in the suspension cross member increases the effective thickness around the supporting portion of the suspension cross member by the thickness of the vibration energy damping member. This can improve the support stiffness of the support portion of the suspension cross member.

In the vehicle noise vibration energy damping structure, the at least one attachment part includes a plurality of attachment parts, and each of the attachment parts is selectively disposed in a position corresponding to the at least one antinode of the vibration of the vibration energy path member.

According to this configuration, the noise vibration energy can be efficiently moved from the vibration energy path member to the vibration energy damping member. This can more efficiently damp the noise vibration energy generated at the power unit and transmitted to the cabin.

DETAILED DESCRIPTION

Exemplary embodiments will now be described in detail with reference to the drawings. In the following description of the embodiments, the front, rear, left, right, top, and bottom of an automobile 1 are simply referred to as "front," "rear," "left," "right," "top," and "bottom," respectively.

First Embodiment

Figure 1:
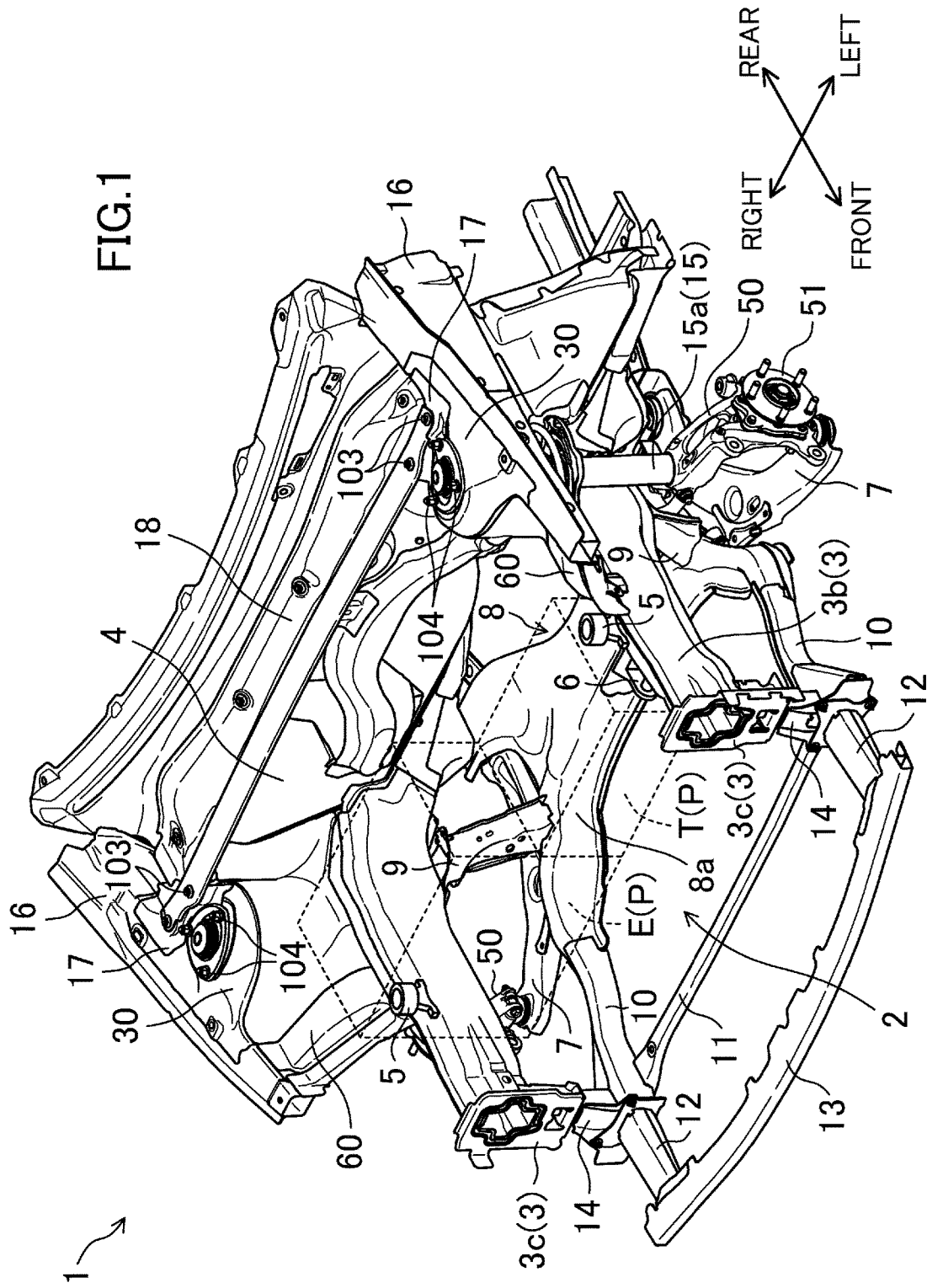
FIG. 1 is a perspective view of a front portion of a vehicle viewed from the upper left of the vehicle, and illustrating the front portion in which a noise vibration energy damping structure according to a first embodiment is utilized.

FIG. 1 illustrates the front portion of a vehicle 1 in which a structure for damping noise vibration energy according to a first embodiment is utilized. The front portion of this vehicle 1 is provided with an engine compartment 2 housing a power unit P comprising an engine E and a transmission T which drive front wheels (not shown) of the vehicle 1. The engine E is transversely disposed within the engine compartment 2, and the transmission T is disposed on the left of the engine E.

A pair of left and right front side frames 3 are disposed at both ends of the engine compartment 2 in the width direction of the vehicle (hereinafter referred to as "the width direction") so as to extend in the front and rear direction. The engine is disposed between the left and right front side frames.

The pair of left and right front side frames 3 have a rectangular closed cross section. Specifically, each front side frame 3 has a closed cross section comprised of an inner frame 3a opening outwardly in the width direction and having a U-shaped cross section (see FIG. 3), and an outer frame 3b substantially formed in the shape of a flat plate, and vertically coupling outer ends of upper and lower walls of the inner frame 3a together in the width direction. The rear portion of each front side frame 3 is a kicked portion whose height position is lowered toward the rear, and a dash panel 4 dividing the vehicle 1 into the engine compartment 2 and the cabin is disposed in a position corresponding to the kicked portion in the longitudinal direction of the vehicle (hereinafter referred to as "the longitudinal direction"). The kicked portion of each front side frame 3 is joined to the dash panel 4.

The front end of each front side frame 3 is provided with a flange 3c. Although not shown, a rear end of a crash can coupled to a bumper beam is fastened to each flange 3c.

A side supporting device 5 mounting and supporting the power unit P thereon is attached to the intermediate part of the inner frame 3a of each front side frame 3 in the longitudinal direction so as to protrude toward the engine compartment 2. The right side supporting device 5 directly mounts and supports the engine E, and the left side supporting device 5 mounts and supports the transmission T coupled to the engine E to allow the supporting devices 5 to indirectly mount and support the engine E.

In the first embodiment, the front side frame 3 corresponds to a vibration energy path member vibrating due to transmission of noise vibration energy generated at the power unit P through the side supporting device 5, and transmitting the noise vibration energy to the cabin (not shown) of the vehicle 1.

At a position which is located in the front of the vehicle 1 below the front side frames 3 and which is the substantially same as the positions of the kicked portions of the front side frames 3 in the longitudinal direction, a pair of left and right front wheel suspension arms 7 respectively supporting the left and right front wheels, and a suspension cross member 8 (hereinafter abbreviatedly referred to as a "sus-cross 8") extending in the width direction and supporting the respective suspension arms 7 are disposed.

The sus-cross 8 has a sus-cross body 8a which is X-shaped when viewed from the vertical direction and which extends in the width direction. Rear ends of the left and right suspension arms 7 are attached to and supported by left and right rear ends of the sus-cross body 8a. This allows the front wheels to be supported by the sus-cross body 8a through the respective suspension arms 7. Left and right side ends of the sus-cross body 8a are provided with a rear frame joining portion 9 extending upward and outward in the width direction, and coupled to a lower wall of the front side frame 3 (precisely, the inner frame 3a). This couples the sus-cross body 8a and the left and right front side frames 3 together, and the sus-cross body 8a couples the pair of the left and right front side frames 3 together in the width direction.

Front extensions 10 each extend forward from the left and right side ends of the sus-cross body 8a. Inner side surfaces of the front ends of the left and right front extensions 10 in the width direction are coupled together by a front cross member 11 extending in the width direction. A stiffener 13 for protecting pedestrians is fixed to the front ends of the front extensions 10 so as to protrude forward. Further, the front ends of the left and right front extensions 10 and the front ends of the left and right front side frames 3 (precisely, the inner frame 3a) are coupled together by front frames 14 extending vertically.

A front intermediate portion of the sus-cross body 8a in the width direction is provided with a rear supporting device 6 extending forward and supporting the power unit. The rear supporting device 6 is coupled to the power unit P through a torque rod (not shown) extending rearward from the rear portion of the transmission T. The rear supporting device 6 substantially prevents the power unit P from rotating around a roll axis. The rear supporting device 6 may be coupled to the engine E.

As illustrated in FIG. 1, the respective front wheel suspension arms 7 are vent outward in the width direction toward the front. Wheel hubs 51 are coupled to front outer ends of the respective front wheel suspension arms 7 in the width direction through hub carriers 50. The left and right front wheels are connected to the corresponding wheel hubs 51 through hub bolts. In FIG. 1, the right wheel hub 51 and other components are invisible because they overlap with the right front side frame 3.

To the left and right hub carriers 50, lower ends of rods 15a of left and right front dampers 15 (only the left front damper 15 is visible in FIG. 1) are respectively coupled. Left and right suspension towers 30 (hereinafter simply referred to as "the sus-towers 30") are respectively disposed at positions corresponding to the respective front dampers 15.

The left and right sus-towers 30 stand such that the left and right front side frames 3 are respectively coupled to a pair of left and right apron reinforcements 16 (hereinafter simply referred to as "the apron-rein 16") disposed above and outside the front side frame 3 in the width direction and extending in the longitudinal direction. Each of the left and right sus-towers 30 is formed so as to bulge toward the inner side of the corresponding apron rein 16 in the width direction (that is to say, toward the engine compartment 2).

Figure 2:
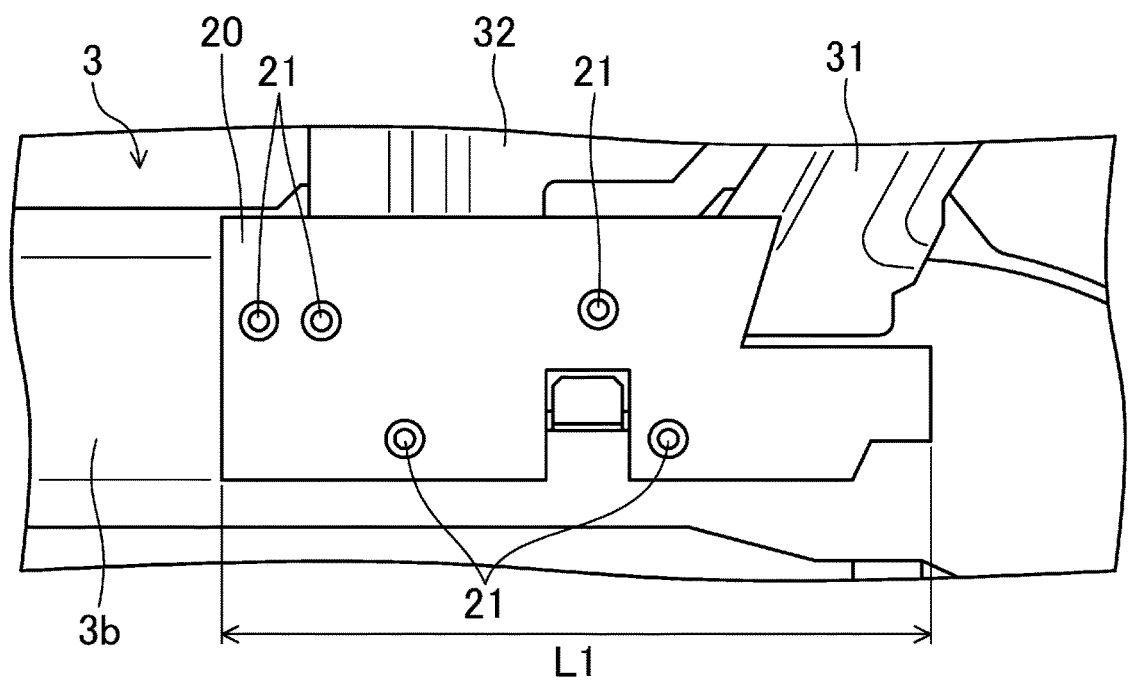
FIG. 2 is an enlarged side view of attachment parts of a noise vibration energy absorbing panel in a left front side frame.

As illustrated in FIG. 2, a first reinforcing member 31 is provided to a surface of a rear portion of a side wall 30a of each sus-tower 30, the surface away from the engine compartment 2. The first reinforcing member 31 extends vertically, and the first reinforcing member 31 and the side wall of the sus-tower 30 constitute the closed cross sectional structure. The lower end of each first reinforcing member 31 is connected to the outer frame 3b of the front side frame 3.

Upper ends of left and right hinge pillars (not shown) are respectively joined to rear ends of the left and right apron reins 16.

A front end of an apron gusset 17 is joined to a rear portion of the upper end of each sus-tower 30. As illustrated in FIG. 1, each of the left and right apron gussets 17 spreads so as to fill a gap between the rear portion of the upper end of the sus-tower 30 and the apron rein 16 when viewed from above, and the outer side end of the apron gusset 17 in the width direction is joined to the apron rein 16.

In substantially the same height as the apron rein 16, the widthwise outer end of a cowl member 18 extending in the width direction is coupled to the corresponding apron gusset 17 with two bolts 103. As a result, the apron gusset 17 couples the cowl member 18 to the apron rein 16.

Wheel apron panel 60 extending vertically are respectively coupled to the front ends of the sus-towers 30 such that the left and right front side frames 3 are respectively coupled to the left and right apron reins 16. As illustrated in FIG. 2, a surface of the wheel apron panel 60 away from the engine compartment 2 (i.e., the widthwise outer surface) is provided with a second reinforcing member 32 constituting, together with the wheel apron panel 60, a closed cross section.

During the operation of the power unit P, noise vibration energy generated at the power unit P, in particular, noise vibration energy relating to vibration of the engine E and gear noise of the transmission T is transmitted to the cabin through the side supporting device 5 and the front side frame 3. If such noise vibration energy is transmitted to the cabin, noise based on such vibration energy is transmitted to a passenger of the vehicle 1, such that a problem of noise NVH becomes significant.

Thus, in this first embodiment, in order to damp the noise vibration energy, a vibration energy absorbing panel 20 is attached onto the front side frame 3 constituting a transmission path transmitting the noise vibration energy to the cabin, in particular, onto the outer frame 3b of the front side frame 3, absorbing at least part of the noise vibration energy to be transmitted from the front side frame 3 to the cabin.

The configuration of the vibration energy absorbing panel 20 and a structure for attaching the vibration energy absorbing panel 20 to the front side frame 3 will now be described in detail. In the following description, a case where the vibration energy absorbing panel 20 is attached to the outer frame 3b of the left front side frame 3 will be described. In the following description, a simple description "the front side frame 3" refers to the left front side frame 3.

The vibration energy absorbing panel 20 is configured to, by transmission of vibration of the front side frame 3 to the vibration energy absorbing panel 20, absorb at least part of the noise vibration energy to be transmitted to the cabin through the front side frame 3, thereby damping the noise vibration energy to be transmitted from the front side frame 3 to the cabin.

Figure 3:
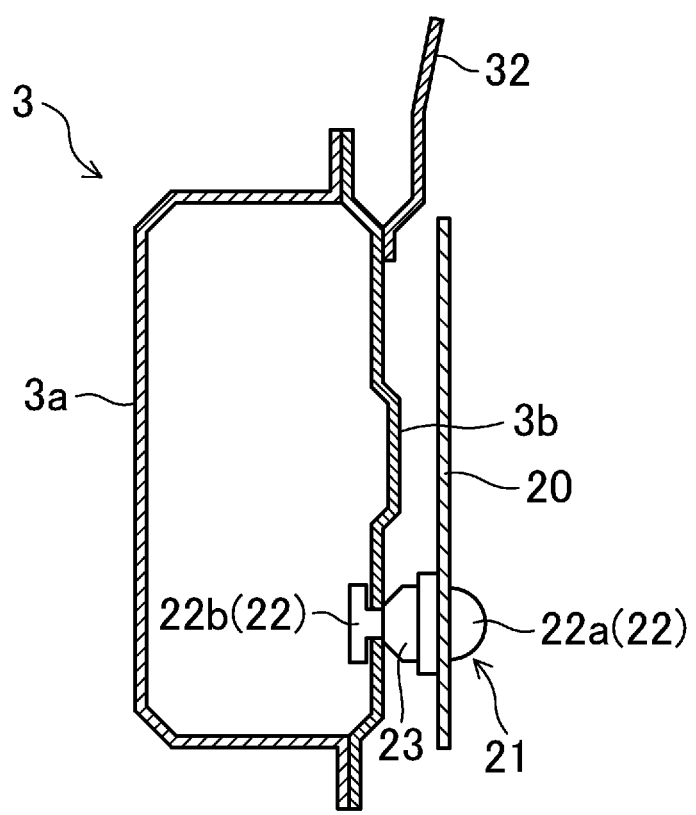
FIG. 3 is a cross-sectional view taken along a plane extending vertically and passing through a second reinforcing member and the attachment parts in FIG. 2.

In the first embodiment, the vibration energy absorbing panel 20 is comprised of a metal plate made of the same material as the outer frame 3b of the front side frame 3. The vibration energy absorbing panel 20 has the same thickness as the outer frame 3b, as illustrated in FIG. 3. Note that the material of the vibration energy absorbing panel 20 does not have to be the same as that of the outer frame 3b. As described later, the material of the vibration energy absorbing panel 20 may be different from that of the outer frame 3b as long as the vibration energy absorbing panel 20 constitutes fins vibrating due to the noise vibration energy. Note that the thickness of the vibration energy absorbing panel 20 does not have to be the same as that of the outer frame 3b. As described later, the thickness of the vibration energy absorbing panel 20 may be different from that of the outer frame 3b as long as the vibration energy absorbing panel 20 constitutes a fin vibrating due to the noise vibration energy. For example, the thickness of the vibration energy absorbing panel 20 can be 0.5 to 1.2 times as large as the thickness of the outer frame 3b.

The vibration energy absorbing panel 20 is disposed at a longitudinal position of the front side frame 3 between the side supporting device 5 and the cabin. Specifically, the front end of the vibration energy absorbing panel 20 is located in substantially the same longitudinal position as the side supporting device 5. The vibration energy absorbing panel 20 extends rearward from its front end along the longitudinal direction that is a transmission direction in which the vibration of the outer frame 3b caused by the noise vibration energy is transmitted.

The vibration energy absorbing panel 20 is notched so as to substantially avoid other components provided to the front of the vehicle 1. Specifically, in the first embodiment, a notch of the vibration energy absorbing panel 20 in the substantially intermediate position in the longitudinal direction and in the lower position thereof is formed to substantially avoid a piping support member (not shown) supporting a fuel piping by the front side frame 3. Another notch of the vibration energy absorbing panel 20 in the upper rear portion thereof is formed to substantially avoid a part of the first reinforcing member 31.

As illustrated in FIGS. 2 and 3, a plurality of attachment parts 21 (five in the first embodiment) attaching the vibration energy absorbing panel 20 to the outer frame 3b of the front side frame 3 are provided. Specifically, two of them are disposed in a position adjacent to the front end of the vibration energy absorbing panel 20 and a substantially vertically intermediate position of the vibration energy absorbing panel 20. One of them is disposed in substantially the same position as the second reinforcing member 32 in the longitudinal direction and a position adjacent to the lower end of the vibration energy absorbing panel 20. One of them is disposed in a position slightly above the notch substantially avoiding the piping support member. One of them is disposed in a position behind the notch substantially avoiding the piping support member and a position adjacent to the lower end of the vibration energy absorbing panel 20.

Each attachment part 21 is comprised of a rivet 22 and a nut 23, as illustrated in FIG. 3. The vibration energy absorbing panel 20 is attached to and supported by the outer frame 3b by a leg 22b of the rivet 22 while being sandwiched between a head 22a of the rivet 22 and the nut 23. The vibration energy absorbing panel 20 is attached to the outer frame 3b so as to be spaced apart from the outer frame 3b in the width direction by the height of the nut 23. Although specifically described later, the respective attachment parts 21 are disposed in positions corresponding to the antinodes of vibration of the front side frame 3 (precisely, the outer frame 3b) caused by the noise vibration energy.

The vibration energy absorbing panel 20 is attached to the outer frame 3b so as to be spaced from the outer frame 3b in the width direction as described above. As a result, the outer periphery of the vibration energy absorbing panel 20 constitutes a fin having the attachment parts 21 as fixed ends. In the first embodiment, the attachment part 21 is comprised of the rivet 22 and the nut 23, and the vibration energy absorbing panel 20 is attached to the outer frame 3b as if it was attached by a point. In addition, the whole of the outer periphery of the vibration energy absorbing panel 20 is spaced apart from the outer frame 3b, and thus, the whole of the outer periphery of the vibration energy absorbing panel 20 constitutes a fin. The fin vibrates due to the noise vibration energy moved from the front side frame 3 to the vibration energy absorbing panel 20, and converts the noise vibration energy into heat energy. In other words, the noise vibration energy moved from the front side frame 3 to the vibration energy absorbing panel 20 is consumed by the fin constituted by the vibration energy absorbing panel 20 as heat energy. That is to say, the vibration energy absorbing panel 20 has an energy converting function of converting the noise vibration energy into heat energy. As a result, no noise vibration energy is transmitted from the vibration energy absorbing panel 20 to other components.

In the first embodiment, a length L1 of the vibration energy absorbing panel 20 in the transmission direction in which the vibration of the front side frame 3 (precisely, the outer frame 3b) caused by the noise vibration energy is transmitted (i.e., the longitudinal length) is set to be substantially two wavelengths of the vibration of the front side frame 3 (precisely, the outer frame 3b). The specific longitudinal length of the vibration energy absorbing panel 20 will be described later.

In particular, in the first embodiment, devising the arrangement of the respective attachment parts 21 of the vibration energy absorbing panel 20 and the length L1 of the vibration energy absorbing panel 20 allows for efficiently damping the noise vibration energy.

This will be described with reference to FIGS. 4 to 8.

Figure 4:
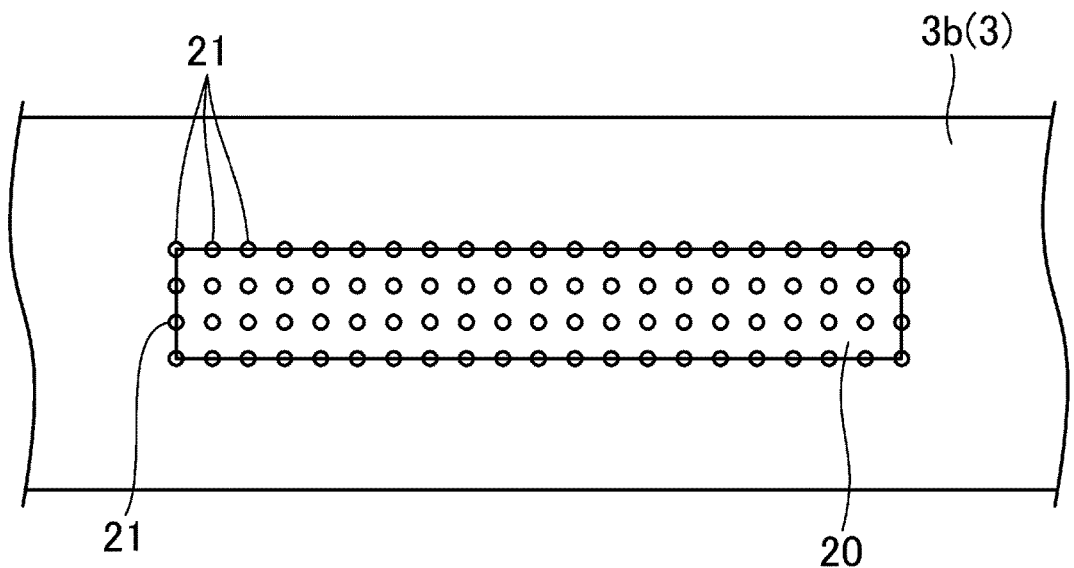
FIG. 4 is a schematic view showing a first model utilized for calculating an damping effect of noise vibration energy according to the positions of the attachment parts of the noise vibration energy absorbing panel to the front side frame.
Figure 5:
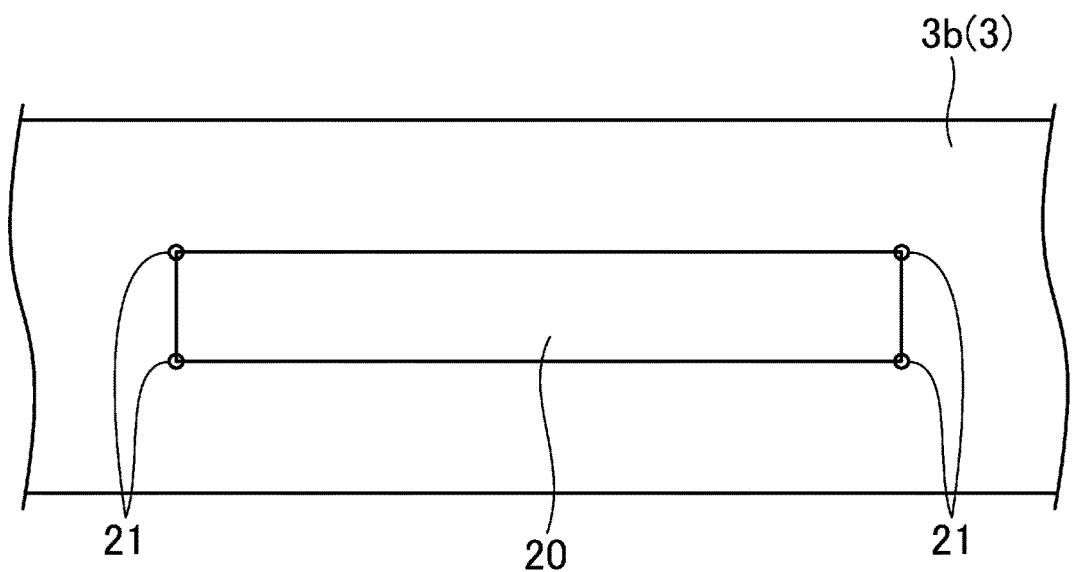
FIG. 5 is a schematic view corresponding to FIG. 4 and illustrating a second model.
Figure 6:
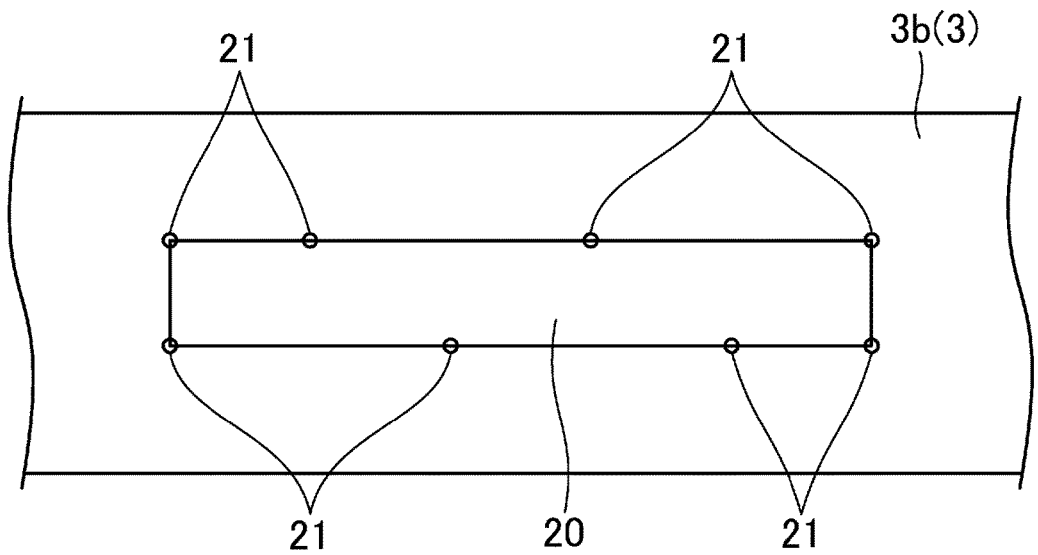
FIG. 6 is a schematic view corresponding to FIG. 4 and illustrating a third model.
Figure 7:
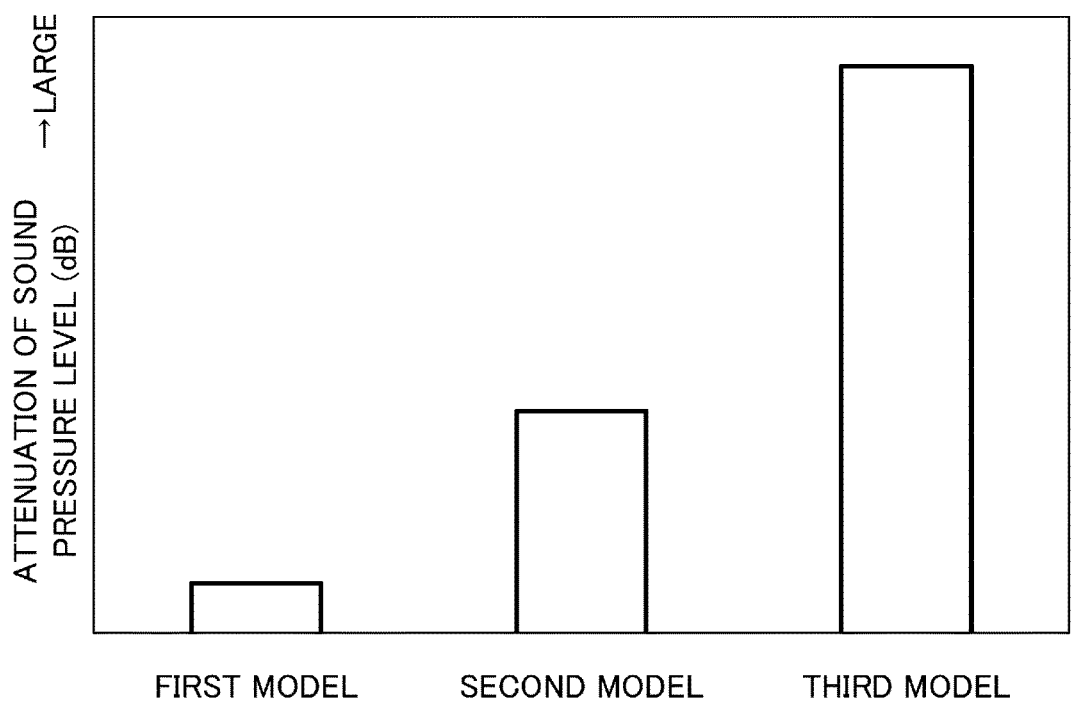
FIG. 7 is calculation results of a relationship between the positions of the attachment parts of the noise vibration energy absorbing panel to the front side frame and an attenuation of the sound pressure level of the noise within the cabin by simulations.

FIG. 7 is calculation results of the relationship between the arrangement of the attachment parts 21 of the vibration energy absorbing panel 20 relative to the front side frame 3 and an attenuation of the sound pressure level of the noise within the cabin by simulations. FIGS. 4 to 6 show models used in the simulations.

In each of FIGS. 4 to 6, the shape, longitudinal length, and longitudinal position of the vibration energy absorbing panel 20 are constant, only the positions of the attachment parts 21 of the vibration energy absorbing panel 20 relative to the outer frame 3b of the front side frame 3 are changed. Specifically, the vibration energy absorbing panel 20 is supposed to have a rectangular shape, a longitudinal length equal to the length of two wavelengths of the vibration of the outer frame 3b, and to be positioned in the longitudinal direction such that the front end of the vibration energy absorbing panel 20 is in the same position as the rear end of the side supporting device 5 in the longitudinal direction.

A first model illustrated in FIG. 4 is a model based on a supposition that the attachment parts 21 are disposed in the whole of the vibration energy absorbing panel 20.

A second model illustrated in FIG. 5 is a model based on a supposition that attachment parts 21 are disposed in only four corners of the vibration energy absorbing panel 20.

A third model illustrated in FIG. 6 is a model based on a supposition that the attachment parts 21 are disposed in selected positions corresponding to the antinodes of the vibration of the outer frame 3b in addition to the four corners of the vibration energy absorbing panel 20. The positions of the antinodes of the vibration of the outer frame 3b are calculated by another simulation in advance. In the former simulation, the lower two corners of the four corners of the vibration energy absorbing panel 20 correspond to the antinodes of the vibration of the outer frame 3b.

The actual attached position of the side supporting device 5 to the front side frame 3 is above the vertical center of the front side frame 3, as illustrated in FIGS. 1 and 2. Thus, the starting point of the noise vibration energy (i.e., the excitement point of the vibration) is also positioned above the vertical center of the front side frame 3. As a result, the antinodes of the vibration differ between the upper and lower portions of the outer frame 3b in the longitudinal direction. This is considered in the simulations shown in FIGS. 4 to 7, and thus, in the third model illustrated in FIG. 6, the attachment parts 21 differ between the upper and lower ends of the vibration energy absorbing panel 20.

The simulations by the first to third models in FIG. 7 shows that the attenuation of the sound pressure level of the noise within the cabin varies according to the disposed positions of the attachment parts 21.

Specifically, in the case of the first model in which the attachment parts 21 are disposed in the whole of the vibration energy absorbing panel 20, the sound pressure level is only slightly damped. If the attachment parts 21 are disposed in the whole of the vibration energy absorbing panel 20, the attachment parts 21 of the outer frame 3b are necessarily disposed in the positions corresponding to the antinodes of the vibration. However, this makes it difficult to allow the vibration energy absorbing panel 20 to serve as a fin. As a result, the noise vibration energy transmitted from the outer frame 3b to the vibration energy absorbing panel 20 is less likely to be consumed.

In contrast, the second model in which the attachment parts 21 are disposed at only the four corner of the vibration energy absorbing panel 20 shows that the sound pressure level can be damped more significantly than in the first model. That is because the reduced number of the attachment parts 21 allows the outer periphery of the vibration energy absorbing panel 20 to serve as a fin, significantly.

The third model in which the attachment parts 21 are selectively disposed in the positions corresponding to the antinodes of vibration of the outer frame 3b shows that the attenuation of the sound pressure level is twice or more as large as that in the first and second models. That is because the attachment parts 21 are disposed in the positions corresponding to the antinodes of the vibration of the outer frame 3b, enabling an efficient transmission of the noise vibration energy from the outer frame 3b to the vibration energy absorbing panel 20. In addition, that is also because the fin configured as the vibration energy absorbing panel 20 vibrates as appropriate, such that the noise vibration energy transmitted to the vibration energy absorbing panel 20 can be consumed as heat energy.

Based on the simulation results, in the first embodiment, the plurality of attachment parts 21 are selectively disposed in the positions corresponding to the antinodes of the vibration of the outer frame 3b of the front side frame 3 due to the noise vibration energy. The positions of the antinodes of the vibration of the outer frame 3b due to the noise vibration energy are obtained through a calculation by another simulation. As described above, because of the actual attached position of the side supporting device 5 to the front side frame 3, the positions of the antinodes of the vibration of the upper and lower portions of the outer frame 3b are displaced from one another in the longitudinal direction. Therefore, as illustrated in FIG. 2, the positions of the attachment parts 21 in the upper portion of the outer frame 3b and the positions of the attachment parts 21 in the lower portion of the outer frame 3b are displaced from one another in the longitudinal direction.

Here, the above description "selectively disposed" means that, for example, the positions corresponding to the antinodes of the vibration of the outer frame 3b are selected and the attachment parts 21 are disposed in these positions, not including the case where the attachment parts 21 are provided over the whole of the vibration energy absorbing panel 20 and as a result, the attachment parts 21 are disposed in the positions corresponding to the antinodes of the vibration of the outer frame 3b just like the first model illustrated in FIG. 4.

Figure 8:
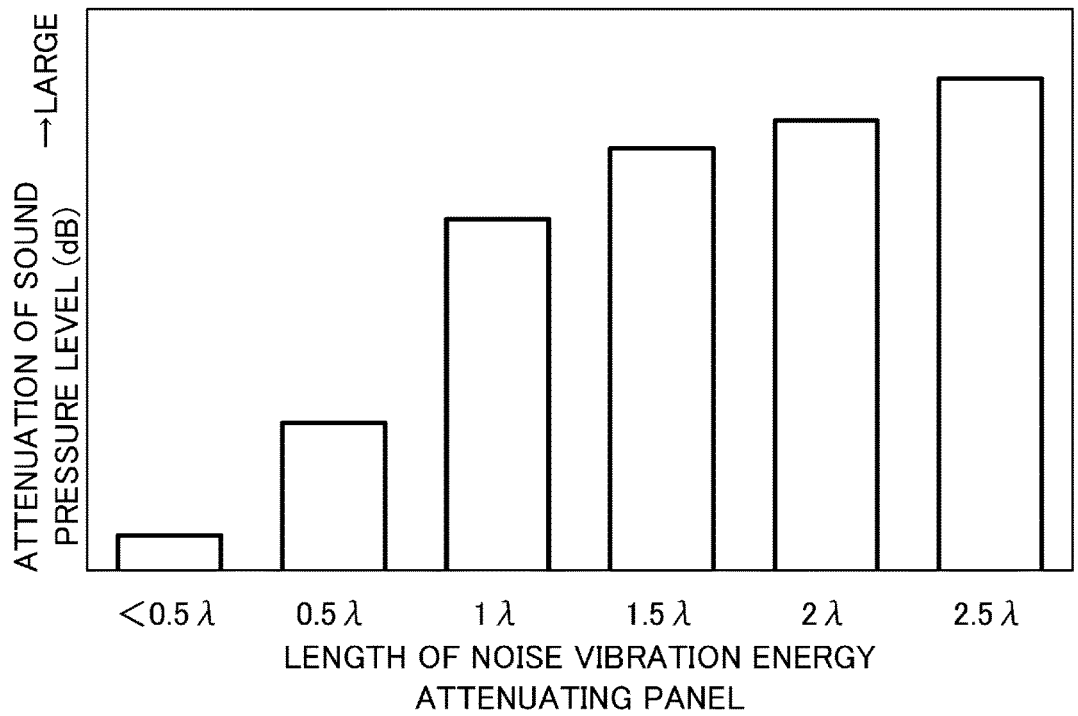
FIG. 8 is a graph showing simulated calculation results of the relationship between the longitudinal length of the noise vibration energy absorbing panel and the attenuation of the sound pressure level of the noise within the cabin.

FIG. 8 is a calculation result of the relationship between the longitudinal length L1 of the vibration energy absorbing panel 20 and an attenuation of the sound pressure level of the noise within the cabin by simulations. In this calculation, based on the assumption that the vibration energy absorbing panel 20 has a rectangular shape and the front end of the vibration energy absorbing panel 20 is disposed in the same position as the rear end of the side supporting device 5 in the longitudinal direction, the attenuation of the noise vibration energy is calculated when the vibration energy absorbing panel 20 is stretched rearward from the front end thereof. The disposition of the attachment parts 21 is assumed such that, in a situation where the position of the antinodes of vibration of the outer frame 3b is included in the region where the vibration energy absorbing panel 20 is disposed, the attachment parts 21 are disposed in not only the four corners of the vibration energy absorbing panel 20 but also the positions corresponding to the antinodes of vibration of the outer frame 3b, and in a situation where the position of the antinodes of the vibration of the outer frame 3b is not included in the region where the vibration energy absorbing panel 20 is disposed, the attachment parts 21 are disposed in only the four corners of the vibration energy absorbing panel 20. A sign $\lambda$ in the graph indicates a wavelength of the vibration of the outer frame 3b, and for example, "2$\lambda$" indicates that the longitudinal length L1 of the vibration energy absorbing panel 20 is equal to the length of two wavelengths.

FIG. 8 shows that, if the longitudinal length L1 of the vibration energy absorbing panel 20 is less than the half of the wavelength of the vibration (less than 0.5$\lambda$ in FIG. 8), the attenuation of the noise vibration energy is small, and thus, the damping effect of the noise vibration energy by the vibration energy absorbing panel 20 is small. That is because if the longitudinal length L1 of the vibration energy absorbing panel 20 is too small, the area corresponding to the antinodes of the vibration of the outer frame 3b is not included, and thus, the noise vibration energy is less likely to be transmitted from the outer frame 3b to the vibration energy absorbing panel 20. That is also because, even if the vibration energy absorbing panel 20 includes the area corresponding to the antinodes of the vibration of the outer frame 3b, the too small length L of the vibration energy absorbing panel 20 makes it difficult to allow the fin configured as the vibration energy absorbing panel 20 to vibrate, substantially preventing consumption of the noise vibration energy which has been transmitted to the vibration energy absorbing panel 20 as heat energy.

In contrast, if the longitudinal length L1 of the vibration energy absorbing panel 20 is equal to or more than the half of the wavelength of the outer frame 3b (0.5$\lambda$, to 2.5$\lambda$, in FIG. 8), the attenuation of the sound pressure level of the noise is increased. In particular, if the longitudinal length L1 of the vibration energy absorbing panel 20 is equal to or more than one wavelength of the outer frame 3b, the attenuating effect of the sound pressure level becomes remarkably high. That is because, if the longitudinal length L1 of the vibration energy absorbing panel 20 is equal to or more than the half of one wavelength of the vibration, the vibration energy absorbing panel 20 is attached to the outer frame 3b in the position corresponding to at least one of the antinodes of the vibration, and thus, the noise vibration can be efficiently transmitted from the outer frame 3b to vibration energy absorbing panel 20. That may also be because, if the longitudinal length L1 of the vibration energy absorbing panel 20 is equal to or more than one wavelength of the outer frame 3b, the enough length can be ensured to allow the fin configured as the vibration energy absorbing panel 20 to vibrate appropriately, and thus, the attenuating effect of the sound pressure level becomes remarkably high.

Based on the simulation results, in this embodiment, the length L1 in the transmission direction in which the vibration of the outer frame 3b of the front side frame 3 caused by the noise vibration energy is transmitted (i.e., the longitudinal direction) is set to be equal to or more than the half of the wavelength of the vibration of the outer frame 3b, specifically, about two wavelengths.

Figure 9:
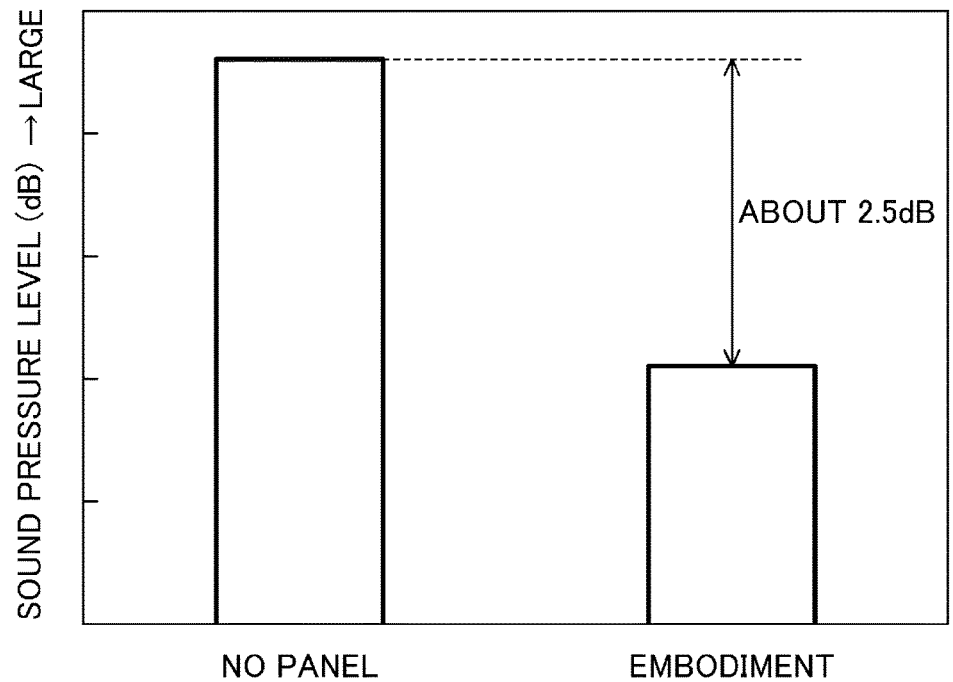
FIG. 9 is a graph showing an actual attenuation of the sound pressure level of the noise within the cabin according to the noise vibration energy damping structure.

FIG. 9 shows the actual attenuating effect of the sound pressure level of the noise within the cabin by the noise vibration energy damping structure of the first embodiment having such a configuration of the vibration energy absorbing panel 20 and such an attached structure of the vibration energy absorbing panel 20 to the front side frame 3. Here, the vibration energy absorbing panel 20 is attached to the outer frame 3b of the left front side frame 3, and the attachment parts 21 are disposed in the positions shown in FIG. 2. The graph of FIG. 9 shows the sound pressure level of the noise within the cabin in a frequency region ranging from 500 kHz to 3000 kHz, including the frequency equivalent to, e.g., the actual vibration of the engine E and the gear noise of the transmission T. The vertical axis of the graph of FIG. 9 is incremented or decremented for every 1 dB. That is to say, the difference between the upper and lower limits in the vertical axis in the graph of FIG. 9 is 5 dB.

FIG. 9 shows that disposing the vibration energy absorbing panel 20 as described above reduces the sound pressure level by about 2.5 dB, compared with the case where no vibration energy absorbing panel 20 is disposed. This means that, in the noise vibration energy, the noise vibration energy to be transmitted to the cabin is damped to be about half. Accordingly, it can be confirmed that the sound vibration energy damping structure of the first embodiment can efficiently damp the noise vibration energy.

Accordingly, the damping structure according to the first embodiment includes: a front side frame 3, to which the side supporting device 5 supporting the power unit P is attached, constituting a transmission path which vibrates by receiving noise vibration energy transmitted through the side supporting device 5, and which transmits the noise vibration energy to the cabin; and a vibration energy absorbing panel 20 provided on the transmission path of the front side frame 3 through which the noise vibration energy is transmitted, and absorbing, from the front side frame 3, at least part of the noise vibration energy to be transmitted from the front side frame 3 to the cabin. The vibration energy absorbing panel 20 is disposed substantially along a transmission direction in which vibration of the front side frame 3 caused by the noise vibration energy is transmitted. The length L1 of the vibration energy absorbing panel 20 in the transmission direction is equal to or more than the half of the wavelength of the vibration of the front side frame 3. The front side frame 3 is provided with the attachment parts 21 to which the vibration energy absorbing panel 20 is attached, and the attachment parts 21 are disposed in the positions corresponding to the antinodes of the vibration of the front side frame 3. This configuration can efficiently transmit the vibration energy, generated at the power unit P, from the front side frame 3 to the vibration energy absorbing panel 20, making it possible to efficiently damp the noise vibration energy which is to be transmitted to the cabin through the front side frame 3.

Also, in the first embodiment, the vibration energy absorbing panel 20 may have a planar shape, and may have a length equal to or more than the half of the wavelength of the vibration of the front side frame 3. This can reduce an increase in the size of the vehicle due to providing the vibration energy absorbing panel 20 as much as possible.

Further, in the first embodiment, the attachment part 21 is comprised of the rivet 22 and the nut 23, and the vibration energy absorbing panel 20 is spaced apart from the outer frame 3b in the width direction, but is attached to the outer frame 3b by a point. Thus, the whole of the outer periphery of the vibration energy absorbing panel 20 constitutes the fin. This allows the substantially entire vibration energy absorbing panel 20 to consume the noise vibration energy transmitted from the front side frame 3 to the vibration energy absorbing panel 20 as heat energy. As a result, it is possible to more efficiently damp the noise vibration energy to be transmitted to the cabin through the front side frame 3.

Second Embodiment

A second embodiment will now be described in detail with reference to the drawings. In the following description, the same reference numerals as those in the first embodiment are used to represent equivalent elements, and the detailed explanation thereof will be omitted.

Figure 10:
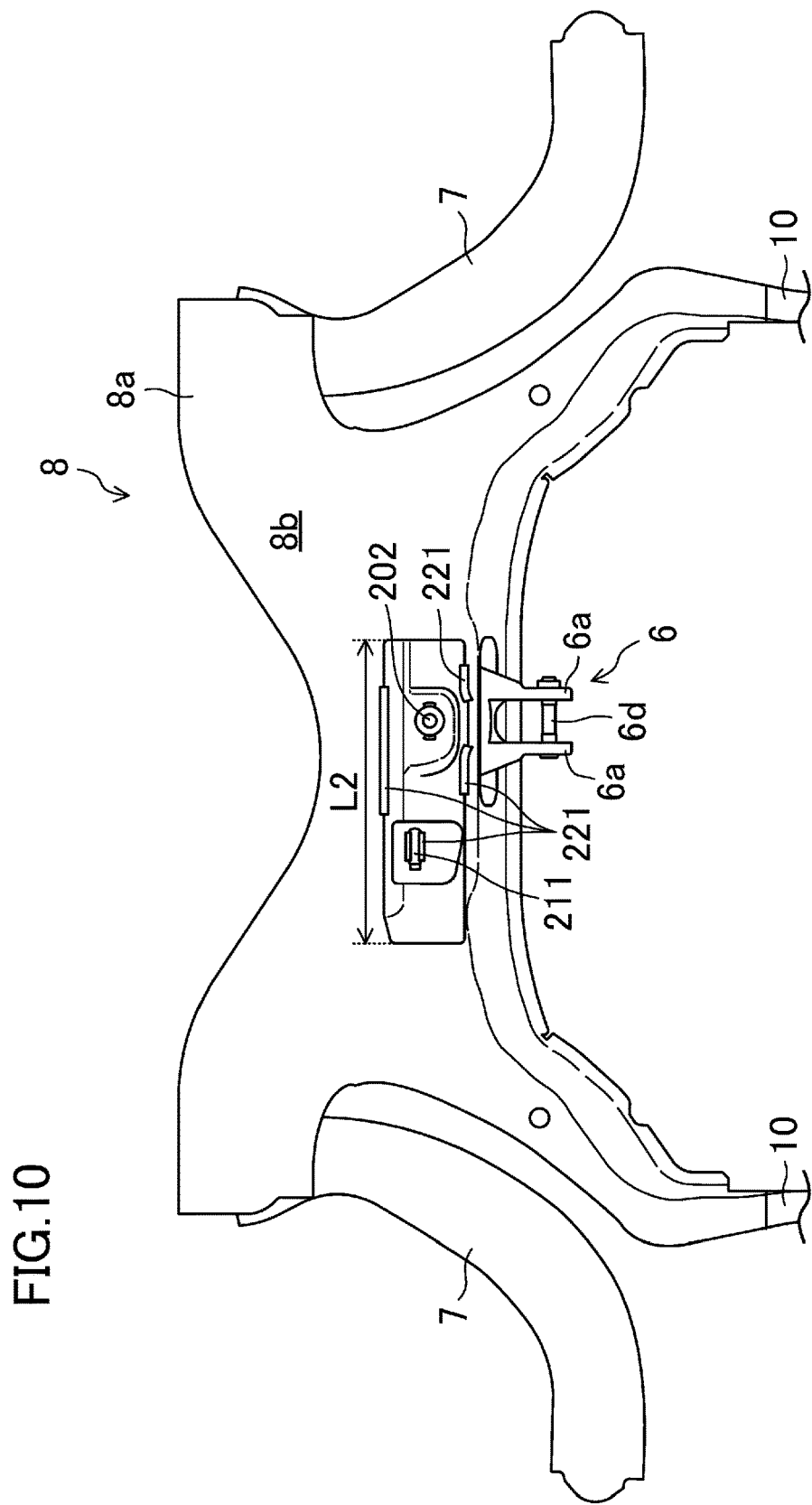
FIG. 10 is a plan view of a suspension cross member in the front of the vehicle viewed from above according to a noise vibration energy damping structure of a second embodiment.

As illustrated in FIG. 10, the second embodiment has the same configuration as the first embodiment, except that a noise vibration energy absorbing panel 220 is attached to the sus-cross 8. That is to say, in the second embodiment, the sus-cross 8 corresponds to the vibration energy path member.

First, the configuration of the rear supporting device 6 and the structure of attaching the rear supporting device 6 to the sus-cross 8 will be described. Just like the first embodiment, the rear supporting device 6 in the second embodiment is also coupled to the power unit P through a torque rod (not shown) extending rearward from the rear portion of the transmission T.

Figure 11:
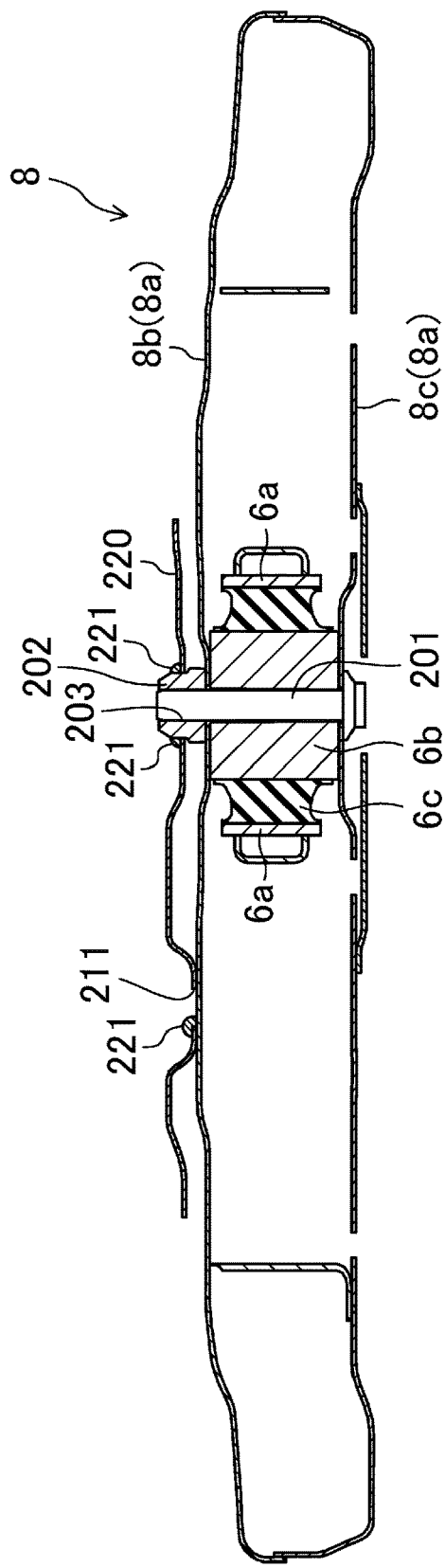
FIG. 11 is a cross-sectional view taken along a plane extending along the noise vibration energy absorbing panel in a width direction of the vehicle, and passing through a rear supporting device in FIG. 10.

As illustrated in FIGS. 10 and 11, the rear supporting device 6 is provided to a substantially widthwise center of the sus-cross body 8a in the width direction, specifically, a portion closer to the left side relative to the widthwise center. The rear supporting device 6 includes two arm portions 6a, a cylindrical member 6b disposed inside the sus-cross body 8a (see FIG. 11), and an elastic member 8c provided to fill a gap between the arm portion 6a and the cylindrical member 6b. The two arm portions 6a have a rear portion entering the inside of the sus-cross body 8a, and are coupled together in the sus-cross body 8a. A supporting shaft 6d is attached to the front end of the two arm portions 6a, and the rear end of the torque rod extending from the power unit P (precisely, the transmission T) is attached to the rear supporting device 6 through the supporting shaft 6d.

The rear supporting device 6 is attached to and supported by the sus-cross 8 with a bolt 201. Specifically, a weld nut 202 is welded to an upper wall 8b of the sus-cross body 8a, and bolt holes are formed in the upper and lower walls 8b and 8c of the sus-cross body 8a at positions corresponding to a hole 203 of the weld nut 202. As illustrated in FIG. 11, in the rear supporting device 6, the hole of the cylindrical member 6b is disposed so as to communicate with the upper and lower bolt holes and the hole 203 of the weld nut 202, and then, a bolt 201 is inserted thereinto from the bottom and is fastened to the weld nut 202, allowing the rear supporting device 6 to be attached to and supported by the sus-cross 8. Thus, the weld nut 202 constitutes a support portion of the rear supporting device 6.

Next, the configuration of the noise vibration energy absorbing panel 220 and the structure of attaching the vibration energy absorbing panel 220 to the sus-cross 8 will be described.

Figure 12:
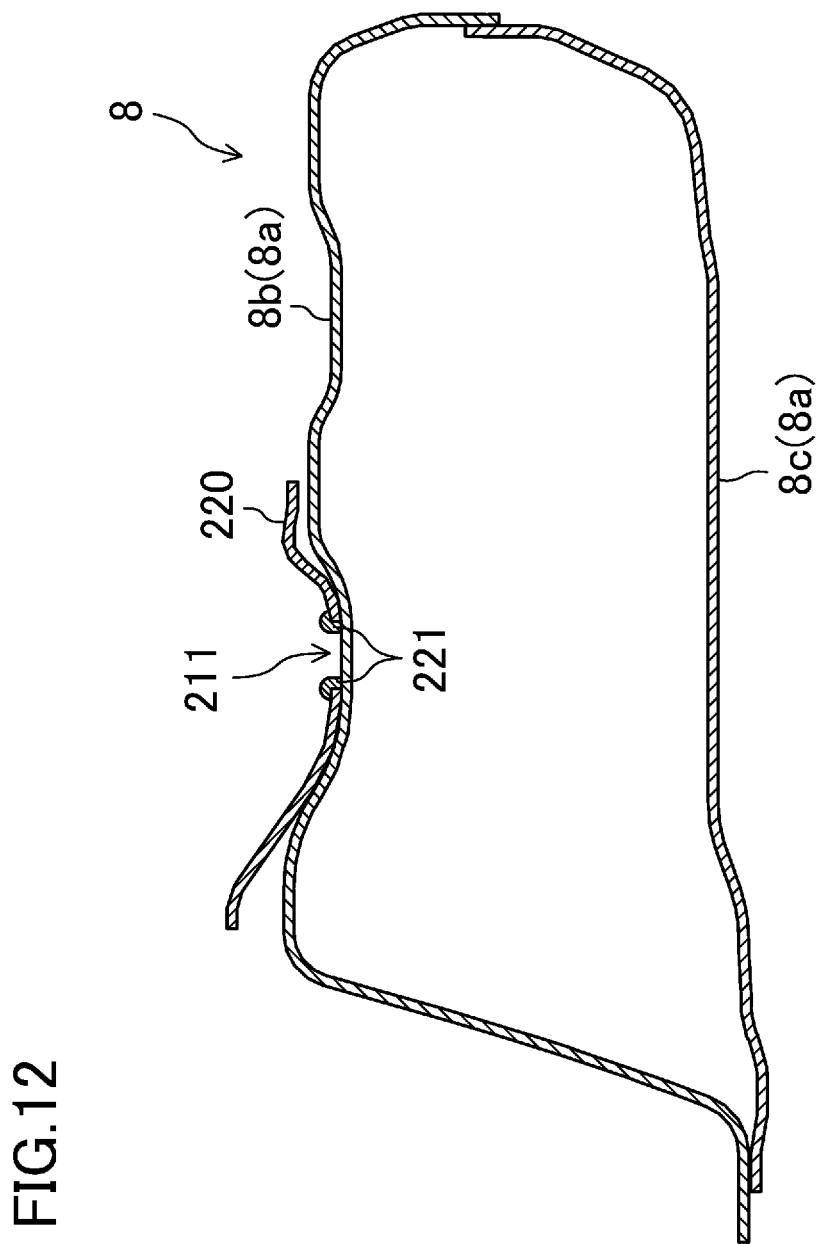
FIG. 12 is a cross-sectional view taken along a plane extending along the noise vibration energy absorbing panel in the longitudinal direction, and passing through a hole provided to the noise vibration energy absorbing panel in FIG. 10.

In the second embodiment, as illustrated in FIGS. 10 to 12, the noise vibration energy absorbing panel 220 is made of a rectangular-shaped, metal plate whose longitudinal direction is the vehicle width direction when viewed from above. Since the sus-cross 8 extends in the width direction, the transmission direction in which vibration of the sus-cross 8 caused by the noise vibration energy from the power unit P is the vehicle width direction. That is to say, in the second embodiment in the similar manner as the first embodiment, the vibration energy absorbing panel 220 extends substantially along the transmission direction in which the vibration of the sus-cross 8 (vibration energy path member) caused by the noise vibration energy is transmitted.

The noise vibration energy absorbing panel 220 is disposed so as to include the starting point of transmission of the noise vibration energy in the upper wall 8b of the sus-cross body 8a (i.e., the weld nut 202). More specifically, the noise vibration energy absorbing panel 220 is disposed so as to include the hole in a portion closer to the left side in the longitudinal direction relative to the center and dispose the weld nut 202 in the hole. As a result, as illustrated in FIGS. 10 and 11, the noise vibration energy absorbing panel 220 is such that the portion on the right of the weld nut 202 is longer than the portion on the left of the weld nut 202.

Just like the first embodiment, a length L2 of the noise sound vibration energy absorbing panel 220 in the transmission direction in which the vibration of the upper wall 8b of the sus-cross body 8a caused by the noise vibration energy is transmitted (the vehicle width direction in this embodiment) is set to be equal to or more than the half of the wavelength of the vibration of the upper wall 8b.

In the second embodiment, the noise vibration energy absorbing panel 220 is attached to the upper wall 8b of the sus-cross body 8a and the weld nut 202 by welding. Specifically, as illustrated in FIGS. 10 and 11, in the hole of the noise vibration energy absorbing panel 220 into which the weld nut 202 is inserted, a part of the inner peripheral edge of the hole is welded to the side surface of the weld nut 202 by welding. Two portions of the front end of the noise vibration energy absorbing panel 220 vertically overlapping with the two arm portions 6a are joined to the upper wall 8b of the sus-cross body 8a by welding. Further, a portion of the rear end of the noise vibration energy absorbing panel 220 located in substantially the same position as the rear supporting device 6 in the width direction is also joined to the upper wall 8b by welding. Furthermore, as illustrated in FIGS. 10 and 12, rectangular holes 211 are provided to the portion on the right of the longitudinal center of the noise vibration energy absorbing panel 220. The front, rear, and left ends of the inner peripheral edge of the hole 211 are joined to the upper wall 8b by welding. As a result, the noise vibration energy absorbing panel 220 is attached onto the upper wall 8b of the sus-cross body 8a that is a transmission path of sound energy.

In the second embodiment, the above described welded portions constitute the attachment parts 221. The attachment parts 221 are disposed in the positions corresponding to the antinodes of the vibration of the upper wall 8b of the sus-cross body 8a, just like the first embodiment. The positions of the antinodes of vibration are calculated by another simulation.

As illustrated in FIGS. 11 and 12, a portion of the outer periphery of the vibration energy absorbing panel 220 except the portions where the attachment parts 221 are provided is spaced apart from and above the upper wall 8b of the sus-cross body 8a. As a result, in the second embodiment, the noise vibration energy absorbing panel 220 constitutes a fin using the attachment part 221 as a fixed end.

In the second embodiment, the length L2 of the noise vibration energy absorbing panel 220 in the transmission direction in which the vibration of the upper wall 8b of the sus-cross body 8a caused by the noise vibration energy is transmitted is set to be equal to or more than the half of the wavelength of the vibration of the sus-cross 8 due to the noise vibration energy. In addition, the attachment parts 221 attaching the noise vibration energy absorbing panel 220 to the sus-cross 8 are disposed in the positions corresponding to the antinodes of the vibration of the sus-cross 8. Thus, the noise vibration energy can efficiently be transmitted from the sus-cross 8 to the vibration energy absorbing panel 20, enabling efficient attenuation of the noise vibration energy to be transmitted to the cabin through the sus-cross 8.

Furthermore, in the second embodiment, the portion of the noise vibration energy absorbing panel 220 adjacent to the weld nut 202 (the support portion) of the rear supporting device 6 is less likely to serve as the fin since the front and rear ends of the portion is joined to the upper wall 8b of the sus-cross body 8a. The adjacent portion of the noise vibration energy absorbing panel 220 allows for increasing the effective thickness of the weld nut 202 of the suspension cross member. This can improve the support stiffness of the rear supporting device 6 of the suspension cross member.

OTHER EMBODIMENTS

The technique disclosed in this specification is not limited to the embodiments described above. Any change can be made within the scope of the claims as appropriate.

For example, in the first and second embodiments, the plurality of attachment parts 21 (221) are selectively disposed in the positions corresponding to the antinodes of the vibration of the vibration energy path member (the front side frame 3 and the sus-cross 8) caused by the noise vibration energy. However, this is only an exemplary embodiment of the technique disclosed in the specification. As long as some of the attachment parts 21 (221) are disposed in the positions corresponding to the antinodes of the vibration of the vibration energy path member, one or more of the attachment parts 21 (221) may be provided in other positions not corresponding to the antinodes of the vibration of the vibration energy path member. This can damp the noise vibration energy, as illustrated in the simulation results of FIG. 7, though its damping effect is smaller than in the case where the attachment parts 21 (221) are selectively disposed in the positions corresponding to the antinodes of the vibration (see the results of the first and second models in FIG. 7).

For example, the vibration energy absorbing panel 20 is attached to the front side frame 3 with the rivet 22 and the bolt 23 in the first embodiment. However, this is only an exemplary embodiment of the technique disclosed in the specification. Alternatively, just like the second embodiment, the vibration energy absorbing panel 20 may be attached to the front side frame 3 by welding. In this case, the vibration energy absorbing panel 20 needs to be bent such that the periphery of the vibration energy absorbing panel 20 is spaced apart from the front side frame 3. Conversely, in the second embodiment, the noise vibration energy absorbing panel 220 may be attached to the sus-cross 8 with the rivet 22 and the bolt 23.

In the first embodiment, the vibration energy absorbing panel 20 is attached to only the outer frame 3b of the left front side frame 3. However, this is only an exemplary embodiment of the technique disclosed in the specification. Alternatively, the vibration energy absorbing panel 20 may be attached to the outer frame 3b of the right front side frame 3, and the vibration energy absorbing panel 20 may also be attached to the widthwise inner side walls and upper and lower walls of the inner frames 3a of the left and right front side frames 3.

Further, the first and second embodiments may be combined together to attach the vibration energy absorbing panel 20 (220) to both the front side frame 3 and the sus-cross 8.

The foregoing embodiments are merely preferred examples in nature, and the scope of the technique disclosed in this specification should not be interpreted in a limited manner. The scope of the technique disclosed in this specification is defined by the appended claims, and all variations and modifications belonging to a range equivalent to the range of the claims are within the scope of the technique disclosed in this specification.

What is claimed is:

1. A noise vibration energy damping structure in a vehicle, the noise vibration energy damping structure damping noise vibration energy that is generated at a power unit of the vehicle comprised of an engine and a transmission and that is to be transmitted to a cabin of the vehicle, the noise vibration energy damping structure comprising:
a vibration energy path member, to which a supporting device supporting the power unit is attached, constituting a transmission path which vibrates by receiving the noise vibration energy transmitted through the supporting device, and which transmits the noise vibration energy to the cabin; and
a vibration energy damping member provided on the transmission path of the vibration energy path member, and absorbing, from the vibration energy path member, at least part of the noise vibration energy to be transmitted from the vibration energy path member to the cabin, wherein
the vibration energy damping member is disposed substantially along a transmission direction in which vibration of the vibration energy path member caused by the noise vibration energy is transmitted,
a length of the vibration energy damping member is equal to or more than a half of a wavelength of the vibration of the vibration energy path member, and
the vibration energy path member is provided with at least one attachment part attaching the vibration energy damping member to the vibration energy path member, and the at least one attachment part is disposed in a position corresponding to a position of at least one antinode of the vibration of the vibration energy path member.

2. The noise vibration energy damping structure of claim 1, wherein
the vibration energy damping member has an energy converting function of converting the noise vibration energy moved from the vibration energy path member into heat energy.

3. The noise vibration energy damping structure of claim 2, wherein
the vibration energy damping member has a planar shape, and
the vibration energy damping member is attached to the vibration energy path member so as to constitute a fin using the at least one attachment part as a fixed end, and the fin is configured to vibrate due to the noise vibration energy moved from the vibration energy path member to convert the noise vibration energy into the heat energy.

4. The noise vibration energy damping structure of claim 3, wherein
the vibration energy path member is a front side frame of the vehicle,
the front side frame extends in a longitudinal direction of the vehicle, and has a rectangular cross section,
the supporting device is disposed in an intermediate part of the front side frame in the longitudinal direction of the vehicle, and
the vibration energy damping member is attached to at least one of side walls of the front side frame in a width direction of the vehicle at a longitudinal position between the supporting device and the cabin.

5. The noise vibration energy damping structure of claim 3, wherein
the vibration energy path member is a suspension cross member coupling a pair of front side frames provided to the vehicle together in a width direction of the vehicle,
a starting point of the suspension cross member at which transmission of the noise vibration energy is started is a support portion of the supporting device disposed in substantially a central portion of the suspension cross member in the width direction of the vehicle, and
the vibration energy damping member extends in the width direction of the vehicle, and is attached to the suspension cross member so as to include the support portion of the suspension cross member.

6. The noise vibration energy damping structure of claim 1, wherein
the at least one attachment part includes a plurality of attachment parts, and
each of the attachment parts is selectively disposed in a position corresponding to the at least one antinode of the vibration of the vibration energy path member.

7. The noise vibration energy damping structure of claim 6, wherein
the vibration energy damping member has an energy converting function of converting the noise vibration energy moved from the vibration energy path member into heat energy.

8. The noise vibration energy damping structure of claim 7, wherein
the vibration energy damping member has a planar shape, and
the vibration energy damping member is attached to the vibration energy path member so as to constitute a fin using the at least one attachment part as a fixed end, and the fin is configured to vibrate due to the noise vibration energy moved from the vibration energy path member to convert the noise vibration energy into the heat energy.

9. The noise vibration energy damping structure of claim 8, wherein
the vibration energy path member is a front side frame of the vehicle,
the front side frame extends in a longitudinal direction of the vehicle, and has a rectangular cross section,
the supporting device is disposed in an intermediate part of the front side frame in the longitudinal direction of the vehicle, and
the vibration energy damping member is attached to at least one of side walls of the front side frame in a width direction of the vehicle at a longitudinal position between the supporting device and the cabin.

10. The noise vibration energy damping structure of claim 8, wherein
the vibration energy path member is a suspension cross member coupling a pair of front side frames provided to the vehicle together in a width direction of the vehicle,
a starting point of the suspension cross member at which transmission of the noise vibration energy is started is a support portion of the supporting device disposed in substantially a central portion of the suspension cross member in the width direction of the vehicle, and the vibration energy damping member extends in the width direction of the vehicle, and is attached to the suspension cross member so as to include the support portion of the suspension cross member.

* * * * *